April 28, 1970     E. METZGER     3,509,010

BUILDING COMPONENT AND METHOD OF FORMING SAME

Filed July 3, 1968

INVENTOR
EMIL METZGER

United States Patent Office 3,509,010
Patented Apr. 28, 1970

3,509,010
BUILDING COMPONENT AND METHOD OF FORMING SAME
Emil Metzger, Thayngen, Switzerland, assignor to Hermann Klaue, Montreux, Switzerland
Continuation-in-part of abandoned application Ser. No. 419,451, Dec. 18, 1964. This application July 3, 1968, Ser. No. 744,258
Claims priority, application Switzerland, May 11, 1964, 6,175/64
Int. Cl. E04f *13/00;* B32b *13/02*
U.S. Cl. 161—162                    9 Claims

ABSTRACT OF THE DISCLOSURE

A synthetic composite building component includes a layer of expanded pellets, such as grains or particles of expanded clay, bonded by a binder and having a covering sheet on at least one surface, or on two opposite surfaces, bonded to the layer by the same binder. The components may be manufactured by continuously feeding a glass fiber mat, impregnated with partially set hydraulic cement still retaining bonding properties, continuously covering the fed strip-form mat with a layer of pellets mixed with partially set hydraulic cement still retaining bonding properties, and, if desired, continuously applying a thickened continuously fed strip of glass fiber mat, similarly impregnated, to the other surface of the layer. The continuous product, after hardening or setting of the hydraulic cement, may be severed into components of the desired size and contour.

CROSS-REFERENCE TO RELATED APPLICATION

This application is a continuation-in-part of copending application Ser. No. 419,451, filed Dec. 18, 1964, for "Method and Article," now abandoned.

BACKGROUND OF THE INVENTION

This invention relates to structural elements or building components and, more particularly, to a novel prefabricated composite structural element or building component.

In the building construction art, it is customary to use, in addition to supporting walls, floors and ceilings, coverings, insulation material, roofing and the like, prefabricated structural elements or building components in the form of, for example, stones, slabs, or plates. Thus, considerable use has been made, and is being made, of lightweight structural elements or building components consisting of lightweight mineral materials with organic additions, and which are secured together by hydraulic binders, such as cements.

However, the production of synthetic stones or slabs of this type is usually very complicated and, in order that the solidity and the insulation effect be of a preselected effective value, such synthetic stones and slabs must have at least a certain minimum thickness. Monolithic artificial or synthetic stones, slabs, and plates of this type either are produced in standard sizes or are made up specially and separately for each individual use. In the first case, where the components are produced in standard sizes, the components must be relatively small, and this naturally requires more time and work during construction of the building. While the second method effects a labor saving at the building site by matching the size of the components to the particular construction with which they are to be used, nevertheless the cost of the components is considerably increased since it is necessary each time to produce specialized and new shapes, and maintenance of a stock of components is practically impossible.

SUMMARY OF THE INVENTION

This invention relates to structural elements or building components and, more particularly, to a novel prefabricated composite structural element or building component and to a method of continuously forming the same in strip form.

In accordance with the invention, a building component comprises a composite body including a layer of expanded pellets, such as grain or particles of expanded clay. At least one surface of this layer has a sheet or strip of covering material bonded thereto by means of the binding agent or binding means which, preferably, is that used to bind together the expanded pellets. Even by itself, the layer of expanded pellets, or grains or particles of expanded clay, has good insulation properties and is light in weight. However, it is very rarely of sufficient solidity to withstand transportation shocks or to serve supporting purposes.

If the covering sheet or strip is suitably chosen, the bond effect between the layer of expanded pellets and the covering sheet or strip results in a load-bearing building component or structural element of sufficient solidity to resist damage. Such a composite component of sufficient solidity to resist damage may be obtained, for example, if the elasticity of the covering layer is not greater than, and preferably is less than, that of the main layer, while the tensile strength of the covering layer, sheet, or strip is greater than that of the main layer. However, the covering layer may be used solely to fulfill the function of sealing and insulation, or else it may be provided as a purely decorative covering.

The layer of bonded expanded pellets, such as particles or grains of expanded clay, may have both surfaces provided with a covering sheet or strip bonded thereto. These covering sheets or strips may comprise, for example, aluminum sheets or strips, paper sheets or strips, or synthetic resin sheets or strips. Either a synthetic resin or a hydraulic binder may serve as a bonding means both for the expanded pellets and for the covering sheet or strip.

However, a preferred covering strip or sheet is a glass fiber mat, and a preferred binder is a hydraulic cement. The glass fiber mat is impregnated with hydraulic cement liquefied with water and, after impregnation, this hydraulic cement is allowed to harden or dry only to such an extent that the mat obtains some stiffness, facilitating handling of the mat in strip form while supplying it to the form filled with the filler material, but without losing the hydraulic binding properties. Thus, when the filler of expanded material pellets, containing hydraulic cement liquefied with water and still having hydraulic binding activity, is brought into contact with the glass fiber mat is strip form, the mat and the filler material are bonded together and hardened at the same time. After complete drying of the resulting composite strip, the binding materials used in the mat and in the expanded pellet filler form a homogeneous network.

In somewhat the same way, the expanded pellets, such as particles or grains of expanded clay, prior to being mixed with the hydraulic binder, may be coated with the hydraulic cement, liquefied with water, and dried to only such an extent that the coating adheres to the pellets but without losing the hydraulic binding properties of the cement.

An object of the present invention is to provide a synthetic composite building component having a relatively great rigidity or solidity even with a relatively small thickness.

Another object of the invention is to provide a synthetic composite building component which can be manufactured as a stock item and can be readily adapted for use in a particular building construction.

A further object of the invention is to provide a synthetic composite building component or structural element including a layer of bonded expanded pellets, such as grains or particles of expanded clay, and a sheet of covering material bonded to at least one surface of such layer.

Yet another object of the invention is to provide a synthetic composite building component or structural element including a layer of particles or grains of an expanded clay bonded by a binder, and a sheet of covering material bonded to at least one surface of said layer by said binder.

A further object of the invention is to provide a method of manufacturing such a synthetic composite building component or structural element.

Another object of the invention is to provide a method of manufacturing such a synthetic composite building component or structural element as a continuous strip by binding a strip of glass fiber mat to a bonded layer of particles or grains of expanded clay, the glass fiber mat being impregnated with hydraulic cement which is partially set and the layer comprising hydraulic cement which is partially set, so that the hydraulic cement in the layer and in the glass fiber mat, after the components are superposed, set at the same time to form a homogenous network.

For an understanding of the principles of the invention, reference is made to the following description of typical embodiments thereof as illustrated in the accompanying drawings.

BRIEF DESCRIPTION OF THE DRAWINGS

In the drawings.

Referring to FIG. 1, in the embodiment of the invention shown therein, the structural element or building component has the shape of a board, slab or plate. The component comprises a layer of particles or grains 1 of an expanded clay, and metal covering layers or sheets 2 are attached to opposite sides of this layer. The particles or grains 1 are bonded together by means of a binder 3 which may be a thermo-setting synthetic resin, or which may be cement, mortar, or the like. This binder serves also to bond the layer of particles 1 to the metal covering sheets 2.

Figure 1:
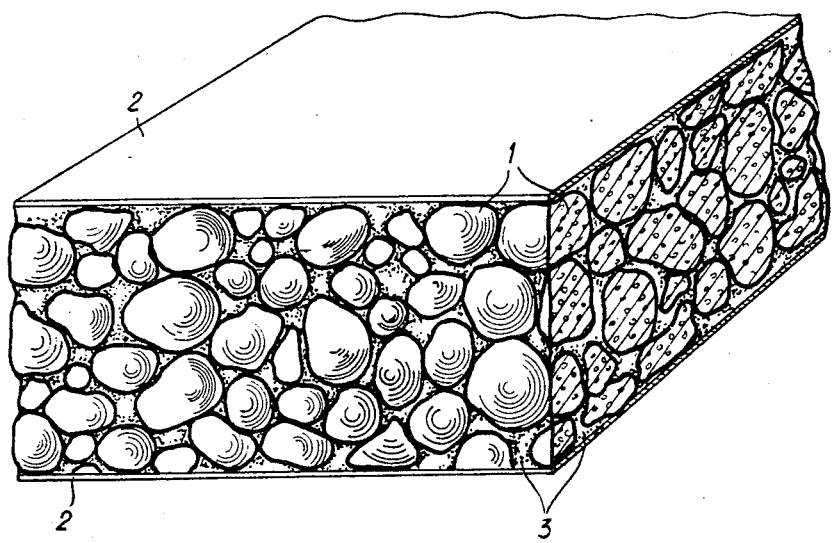
FIG. 1 is a perspective view, partly in section, of one form of synthetic composition building component embodying the invention.

A composite body of the type just described is not only lightweight and has good insulation properties, but is substantially unaffected by shocks and impacts such as may easily damage prefabricated building components during transportation and assembly. This is due not only to the increased solidity resulting from the bonding of the metal sheeting to the layer of bonded particles, but also to the fact that the edges are protected by the sheet metal and the covering sheets are relatively tough. A further advantage of such a component is a relatively high degree of toughness and resistance to treading, so that the component can be used as a floor covering.

A covering sheet of metal or plastic not only facilitates surface connection of the components with components of the base or foundation, but also makes possible the application and adhesion of a wide range of other covering materials. In many cases, the components may also be nailed, since the covering sheet prevents any undesired crumbling of the material forming the main layer. Thus, in many cases it is unnecessary to provide a special extra covering or coating for the component, so that the latter is particularly suitable for use in dividing walls, the inner and outer layers of main supporting walls and for ceiling board, slabs, panels, and the like.

A particular advantage of the described component is that it may be reproduced in any size desired, such as practically a continuous strip, and can be cut later into whatever shape desired. This makes the hitherto expensive shaping and stocking of many sizes of components superfluous.

In the manufacture of components having a covering sheet or layer on one surface only, the covering sheet or layer is continuously fed to an operating station in the form of a thin sheet of metal or plastic material, or of a strip of paper, or of any combination of these elements. This continuously fed sheet or strip is then continuously covered with a layer or mass formed of particles or grains of expanded clay together with a binder, and the layer is built up to any desired thickness. The resulting composite strip leaving the covering station is continuously conveyed through a hardening station provided with a heating device, and this hardening station may be followed by a cutting station where the composite body may be cut into finished components of the sizes desired. That face of the component which is still without a covering layer may, if necessary, also be covered with a sheet of paper or of plastic composition material.

Particularly in the case of boards, slabs, or panels having a covering layer or sheet on both surfaces, the method of production in stages may be used, in which the operation starts with relatively large composite bodies which are cut only subsequently, or immediately before use, into the shapes or sizes desired. Once the layer of expanded clay and binder has been applied to the first covering sheet, it is possible immediately and continuously to apply the second covering layer which is pressed down into the main layer. After this, the entire composite body so formed is conveyed to the hardening location.

The use of an expanded clay comprising various particle sizes, for example from 0.5 to 2 cm., has proven particularly advantageous. Of course, it is possible if necessary, to position reinforcements in the clay layer or layers. Relatively compact synthetic stones may be produced in the described manner, instead of producing relatively large slabs, panels, or boards. Apart from the somewhat greater thickness of the clay layer necessary for synthetic stones, the same method of production may be used as is used for production of plates or slabs. Instead of using a sheet of metal for the covering layer, the covering layer may be formed by a sheet or plate of synthetic resin, by a sheet or plate of high tensile strength with a base of synthetic resin fibers, by a glass fiber felt, by a woven fabric, or by the like sheets.

It is also possible to provide multi-layer coverings instead of homogeneous layers. Thus, a wire grid may be applied to the layer of expanded clay pellets to increase the tensile strength of the composite body, and this wire grid may be, in turn, covered with a sheet of paper or synthetic resin. Where the layer of clay as a covering sheet or layer on both surfaces, the two covering layers either may be the same construction or may of different constructions. Thus, one covering layer may serve only to give sufficient tensile strength and rigidity to the composite component, while the other covering sheet or layer may serve, for example, as an insulating layer or a re-decorating layer.

Figure 2:
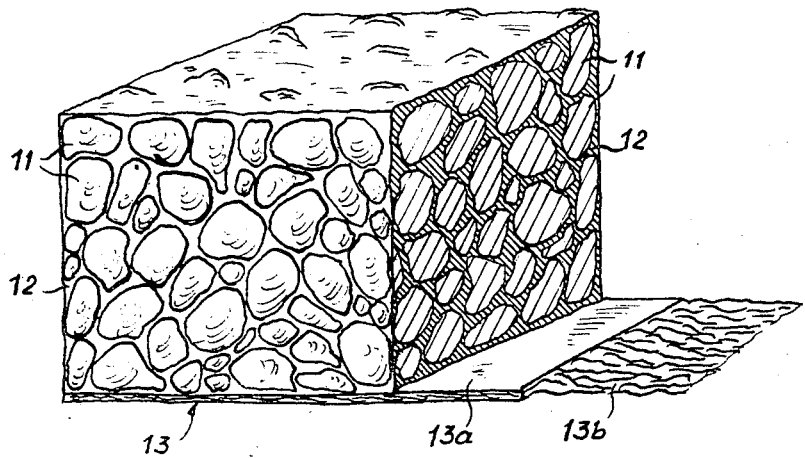
FIG. 2 is a perspective view, partly in section, of another form of synthetic composite building component embodying the invention.

A building component also embodying the invention is shown somewhat diagrammatically in FIG. 2 in partial section, and is illustrated as in the form of a plate, slab, panel, or board. The component of FIG. 2 is made of a layer of expanded clay particles or grains 11 which form substantially the entire thickness of the plate, slab, panel or board. These particles are bonded together by means of a cement 12 to form a rigid body. One side of the bonded layer of clay particles is covered by a covering sheet 13 which is also bonded to the clay layer by means of the cement 12 bonding together the particles 11. This forms a composite body.

In the case of FIG. 2, the covering sheet or layer may be a sheet of glass fiber 13b impregnated with grout, laitance, or the like, as indicated at 13a. A covering sheet or layer of this type not only ensures sufficient surface rigidity for the component as well as protection against shocks and impacts, but furthermore is practically unaffected by weather, temperature or humidity. The covering sheet or layer impregnated with cement adheres to the clay layer, since the cement also serves as an adhesive means or binder. The covering layer may be rendered smooth, non-porous, and watertight, and is not subject to shrinkage or swelling such as might occur in the case of covering layers having a base of plastic composition material or paper. Furthermore, the covering layer 13 is light in weight compared with metal covering layers and has good insulating properties.

In manufacturing the embodiment of the invention shown in FIG. 2, a strip-form glass fiber mat 13 containing glass fiber 13b is impregnated with a hydraulic cement, liquefied with water, and indicated at 13a. Hydraulic cement 13a, after impregnation of glass fiber 13b, may harden or dry only to such an extent that the strip or mat 13 obtains some stiffness which facilitates handling of the strip on supplying it to the form filled with the filler material, but without losing its hydraulic binding properties. Thus, when the filler or layer of expanded pellets, containing hydraulic cement, and the glass fiber mat, also containing hydraulic cement, are brought into contact, the hydraulic cement in both components still has its hydraulic binding activity. Thereby, the two hydraulic cement-containing components will harden together and, after complete drying of the composite strip, the binding material in the fiber glass mat 13 and the binding material 12 in association with the expanded pellets 11, will form a homogenous network.

In essentially the same manner, the pellets 11, prior to being mixed with the hydraulic cement binding material 12, may be coated with hydraulic cement liquefied with water and dried only to such an extent that the coating adheres to the pellets 11 but without losing its hydraulic binding properties.

The building component could, of course, be provided on both surfaces with a covering layer of glass fiber sheeting impregnated with hydraulic cement.

The term "expanded clay," as used herein, refers to a known product which is clay expanded by included gas to obtain a cellular structure, resulting in very small weight per unit volume. This expanded clay, which is known as a sealing material, is usually produced in the form of substantially spherical particles usually having diameters between 0.5 cm. and 2 cm. Such an expanded clay may be that known, for example, under the trademark "LEGGO."

While the foregoing description relates specifically to flat components, it should be understood that the invention is equally applicable to the production of curved or corrugated components.

What is claimed is:

1. A light-weight building component comprising a composite body consisting of a relatively thick layer of particles of expanded clay admixed with hydraulic cement and bonded together by said hydraulic cement, and at least one relatively thin cover sheet of substantially impervious sheet material bonded to at least one surface of said layer by said hydraulic cement.

2. A building component, as claimed in claim 1, including two relatively thin cover sheets of substantially impervious material each bonded to a respective opposite surface of said layer by said hydraulic cement.

3. A building component, as claimed in claim 1, in which said cover sheet comprises sheet material impregnated with hydraulic cement.

4. A building component, as claimed in claim 3, in which said cover sheet comprises a sheet of glass fiber impregnated with said hydraulic cement.

5. A building component, as claimed in claim 1, in which said cover sheet comprises a metal sheet.

6. A method of forming a building component comprising the steps of impregnating a strip of covering material with hydraulic cement liquefied with water; after impregnation, allowing the hydraulic cement to set only to such an extent that the strip obtains some stiffness without the hydraulic cement losing its binding properties; feeding the strip along a support surface and through an operating station; while the strip is passing through the operating station, continuously building up, on the fed strip of covering material, a layer consisting of particles of expanded clay mixed with hydraulic cement which has been permitted to set to only such an extent as to bind the particles without the hydraulic cement losing its hydraulic binding properties; continuously conveying the thus covered strip to a heating and hardening station to set and harden said layer to form a rigid component and to bond said strip to said layer, by virtue of the hydraulic cement of the layer and the covering material setting together to form a homogeneous network; and after the composite continuous strip has been set and hardened, cutting the continuous strip into building components of selective sizes and contours.

7. A method of forming a building component, as claimed in claim 6, including the step of continuously feeding a second identically impregnated strip of covering material into covering contact with the exposed surface of said layer in advance of said heating and hardening station for similar bonding of said second strip of covering material to said layer during heating and hardening of said layer.

8. A method of forming a building component, as claimed in claim 6, comprising utilizing a glass fiber mat as said covering strip.

9. A method of forming a building component, as claimed in claim 8, including the step of, in advance of mixing said particles of expanded clay with hydraulic cement, coating said expanded particles with hydraulic cement liquefied with water and allowing the coating to dry to only such an extent as to adhere to the particles but without losing its hydraulic binding properties.

References Cited

UNITED STATES PATENTS

| 1,896,689 | 2/1933 | Spencer | 161—162 |
| 2,334,694 | 11/1943 | Batcheller | 161—162 |
| 2,806,509 | 9/1957 | Bozzacco et al. | 161—161 |

WILLIAM J. VAN BALEN, Primary Examiner

U.S. Cl. X.R.

52—309; 117—169; 156—242